（12）United States Patent
Pitzer

(10) Patent No.: US 8,831,778 B2
(45) Date of Patent: Sep. 9, 2014

(54) METHOD OF ACCURATE MAPPING WITH MOBILE ROBOTS

(71) Applicant: Robert Bosch GmbH, Stuttgart (DE)

(72) Inventor: Benjamin Pitzer, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 13/666,910

(22) Filed: Nov. 1, 2012

(65) Prior Publication Data

US 2013/0060382 A1    Mar. 7, 2013

Related U.S. Application Data

(63) Continuation of application No. 12/429,425, filed on Apr. 24, 2009, now Pat. No. 8,340,818.

(51) Int. Cl.
*G05B 19/18* (2006.01)

(52) U.S. Cl.
USPC ............ 700/253; 700/245; 700/246; 700/250

(58) Field of Classification Search
CPC . G05D 1/0274; G05D 1/0246; G05D 1/0242; G05D 1/024; G05D 2201/0207; G05D 2201/0215; G05D 1/0255; G05D 2201/0203; G06K 9/3241; G06K 9/4671; G06K 9/78; Y10S 901/01; B60R 2021/01537
USPC ............................ 245/245–264, 59, 103, 104
See application file for complete search history.

*Primary Examiner* — Bhavesh V Amin
(74) *Attorney, Agent, or Firm* — Maginot, Moore & Beck

(57) ABSTRACT

A robotic mapping method includes scanning a robot across a surface to be mapped. Locations of a plurality of points on the surface are sensed during the scanning. A first of the sensed point locations is selected. A preceding subset of the sensed point locations is determined. The preceding subset is disposed before the first sensed point location along a path of the scanning. A following subset of the sensed point locations is determined. The following subset is disposed after the first sensed point location along the path of the scanning. The first sensed point location is represented in a map of the surface by an adjusted first sensed point location. The adjusted first sensed point location is closer to each of the preceding and following subsets of the sensed point locations than is the first sensed point location.

20 Claims, 8 Drawing Sheets

METHOD OF ACCURATE MAPPING WITH MOBILE ROBOTS

CROSS-REFERENCE TO RELATED APPLICATIONS/INCORPORATION BY REFERENCE

This application is a continuation of U.S. patent application Ser. No. 12/429,425 entitled "METHOD OF ACCURATE MAPPING WITH MOBILE ROBOTS", filed Apr. 24, 2009. The complete subject matter of this patent application is hereby incorporated herein by reference, in its entirety.

BACKGROUND OF THE INVENTION

1. Field of the Invention

The present invention relates to mobile robots, and, more particularly, to mapping techniques that are used with mobile robots.

2. Description of the Related Art

Automatic map building of environments, particularly indoor environments, is a basic issue of mobile robotics. Digital two-dimensional and three-dimensional models of the environment are needed in all applications with autonomous mobile robots. If a robot were to have an a priori map, then localization would be a relatively easy task. Alternatively, if the robot were to have a precise, externally referenced position estimate, then mapping would be an easy task. However, problems in which the robot has no a priori map and no external position reference are particularly challenging. Such scenarios may arise for autonomous underwater vehicles (AUVs), mining applications, or planetary surfaces.

The process of robotic mapping involves acquiring spatial models of physical environments via the use of, and for the use of, mobile robots. Maps are often used for robot navigation, such as for localization, and in many other application areas. Robotic mapping techniques without external position reference are generally referred to as SLAM (simultaneous localization and mapping) or CML (concurrent mapping and localization).

Robots are known to include sensors that detect the positions of objects and terrain encountered by the robot as it travels. The sensor may measure the distance between the robot and some object, or between the robot and the surface on which the robot is traveling. These sensor readings are made and recorded relative to the body of the robot. However, the location and orientation of the robot at any given time cannot be precisely determined. If the poses and localization (i.e., orientation and location) of a robot were known, the local outputs of the robot's sensor could be registered into a common coordinate system to create a map. Unfortunately, any mobile robot's determination of its own localization is liable to be imprecise. Because the robot is unable to determine where it is and what its orientation is precisely, its ability to create a map is limited. Moreover, because the robot cannot create an accurate map, its ability to determine its own location and orientation is also limited.

Early work in SLAM assumed that a map used for mobile robots could be modeled as a discrete set of landmarks. Different kinds of representations, or maps, have been proposed in the robotics and artificial intelligence literature. These representations, or maps, range from low-level metric maps, such as landmark maps and occupancy grids, to topological graphs that contain high level qualitative information, or even multiple hierarchies of successively higher level abstractions.

Traditionally, SLAM implementations based on Kalman filter data fusion have relied on simple geometric models for defining landmarks. This limits landmark based algorithms to environments suited to such models and tends to discard a lot of potentially useful data. Only more recently, Nieto et al. showed how to define landmarks composed of raw sensed data.

A limitation of almost all SLAM algorithms lies in the necessity to select appropriate landmarks. By reducing the sensor data to the presence of landmarks, a lot of information originally retrieved by a sensor is usually discarded.

Another problem that arises from using discrete landmarks in SLAM is the problem of data association. Before fusing data into the map, new measurements are associated with existing map landmarks, which has been proven crucial in practical SLAM implementations.

Yet another problem is that all map representations used in current SLAM-based approaches assume a random structure on the map or on the features in the map. In actuality, this is rarely the case, as man-made structures are generally highly structured. The insides of buildings, which are common workplaces for mobile robots, are typically constructed with well known methodology.

What is neither disclosed nor suggested in the art is a robotic mapping method that overcomes the above-described problems with known mapping methods.

Known SLAM methods can be described in mathematical terms presented hereinbelow. In this context, the methods of the present invention described herein may be more easily described and understood.

Known SLAM methods have been designed with the goal of simultaneously estimating both the robot's pose and the map. A SLAM algorithm creates a map while at the same time it estimates the position of the robot inside the map. When a robot operates inside of a building, planar two-dimensional maps are usually sufficient. If, however, a robot has to operate with additional degrees of freedom, then a three-dimensional map may need to be constructed.

At a time t, the following quantities are defined:

$x_t$: A vector describing the position and orientation of the robot.

$u_t$: The control vector that was applied at time t−1 and carries information about the change of the robot's pose.

$z_t^k$: The observations taken from the robot of the $k^{th}$ feature.

$c_t^k$: A correspondence variable between the $k^{th}$ feature and the $i^{th}$ landmark.

m: A vector of features m={$m_i$} representing the environment around the robot.

A more detailed definition of these quantities in the context of a probabilistic model is provided hereinbelow. In probabilistic SLAM, this is often posed as Bayesian filtering formulation. Two main forms of such a formulation exist. One is known as the "online SLAM problem":

$$p(x_t, m | u_{1:t}, z_{1:t}, c_{1:t}) \qquad (1)$$

It involves estimating the posterior over the momentary pose $x_t$ along with the map m. It is called "online" because it involves only estimating quantities at the time t. In contrast, the "full SLAM problem" seeks to calculate a posterior over all quantities:

$$p(x_{1:t}, m | u_{1:t}, z_{1:t}, c_{1:t}) \qquad (2)$$

The full SLAM problem is focused on herein in order to simplify the further discussion. A closed form expression of Equation (2) can be obtained by recursively applying Bayes' Rule and subsequent induction over t:

$$p(x_{1:t}, m | u_{1:t}, z_{1:t}, c_{1:t}) = \eta p(x_0) p(m) \Pi_t [p(x_t | x_{t-1}, u_t) \Pi p(z_t^i | x_t, m, c_t^i)] \qquad (3)$$

Here $p(x_t|x_{t-1}, u_t)$ is known as the "motion model" which describes state transitions of the robot's pose in terms of a probability distribution. The state transitions are assumed to be a Markov process and independent of both the observations and the map. The term $p(z_t^i|x_t, m, c_t^i)$ on the other hand denotes an "observation model" which models an observation $z_t^i$ from a known pose and a known map as a probability distribution. Both models have been studied well for a variety of robots and sensors. The two prior terms $p(x_0)$ and $p(m)$ characterize priors about the first robot pose and about the map, respectively. Usually $p(x_0)$ is used to anchor the initial pose to a fixed location. The map prior $p(m)$ is typically assumed to be unknown and subsumed into the normalizer $\eta$. The process of finding the most probable solution to the full SLAM problem is simply the process of finding the set of poses $\hat{x}_{1:t}$ and the map $\hat{m}$ that maximizes the posterior probability of Equation (3).

$$\hat{x}_{1:t}, \hat{m} = \underset{x_{1:t}, m}{\mathrm{argmax}} p(x_{1:t}, m \mid u_{1:t}, z_{1:t}, c_{1:t}) \qquad (4)$$

A graphical model of this formulation is illustrated in FIG. 1a which shows the Bayes network of traditional landmark based SLAM. Each observation $z_t^k$ is associated with a map feature $m_i$. The non-divergence property is achieved since map features are observed from several locations. Correlations between map features are not considered.

SUMMARY OF THE INVENTION

The present invention provides a method for reconstructing a map based on range measurements from a mobile platform and creating accurate maps of indoor environments. The method includes a novel probabilistic formulation which does not rely on data correspondences. Instead of using occupancy grid maps to represent the environment, geometric map representations and statistical prior models may be used to reconstruct maps from the data collected by a mobile robot.

More particularly, the present invention provides a method of registering multiple surface scans in a common coordinate frame and reconstructing the scanned surface at the same time. The invention further provides a novel probabilistic technique for solving the offline SLAM problem by jointly solving the data registration problem and the faithful reconstruction of the underlying geometry. Prior knowledge is incorporated in the map that is being constructed.

Although the typical landmark SLAM model assumes the environment is unstructured, i.e., that landmarks are randomly and independently distributed in the environment, the method of the present invention may not make this assumption. In the present invention, the measurements may be considered directly without processing them into any landmarks. It may be assumed that there is not any immediate correspondence between the measurements and the landmarks. This assumption may be quite reasonable for a number of situations. For example, a mobile robot equipped with light detection and ranging (LIDAR), which takes a finite number of measurements while it is in motion, is very unlikely to measure the exact same spot twice.

According to the present invention, each observation may create a new feature in the map. It may be assumed that there are no correspondences between observations and known features. Instead, the map prior may be used to estimate the robot's pose and the map.

The map prior may be expressed as a probability distribution which represents a prior distribution of all measured scenes. An exact probabilistic model of this distribution may be infeasible and probably not even well defined. Hence, the present invention may focus on partial models which represent properties of the surface structure. For the optimization of the SLAM problem, a good surface prior may be very helpful. The observation model, the motion model, as well as the prior on the first pose may be at their equilibrium by using the measurements. This means that without any map prior, the most probable solution may be the measurement itself. According to the present invention, priors may be used representing three properties: manifold priors, smoothness priors and priors for the orientation.

The present invention may be used in the fields of robotics, mapping and 3D reconstruction. Due to the intrinsic limitations of sensor systems, spatial sensor interpretation is fundamentally an underconstrained problem. Incorporating simple priors on the environment according to the present invention enables a robot to recover better world models. The present invention provides a novel formulation of the SLAM problem which incorporates map priors and does not rely on the notion of landmarks.

The invention comprises, in one form thereof, a robotic mapping method including scanning a robot across a surface to be mapped. Locations of a plurality of points on the surface are sensed during the scanning. A first of the sensed point locations is selected. A first subset of the sensed point locations that are within a vicinity of the first sensed point location is determined. A line segment that approximates the first subset of sensed point locations is ascertained. The first sensed point location is represented in a map of the surface by an adjusted first sensed point location. The adjusted first sensed point location is closer to the line segment than is the first sensed point location.

The invention comprises, in another form thereof, a robotic mapping method including scanning a robot across a surface to be mapped. Locations of a plurality of points on the surface are sensed during the scanning. A first of the sensed point locations is selected. A preceding subset of the sensed point locations is determined. The preceding subset is disposed before the first sensed point location along a path of the scanning. A following subset of the sensed point locations is determined. The following subset is disposed after the first sensed point location along the path of the scanning. The first sensed point location is represented in a map of the surface by an adjusted first sensed point location. The adjusted first sensed point location is closer to each of the preceding and following subsets of the sensed point locations than is the first sensed point location.

The invention comprises, in yet another form thereof, a robotic mapping method including scanning at least one robot across a surface to be mapped. The scanning includes a first scan and a second scan. Locations of a plurality of points on the surface are sensed. A first set of the sensed point locations are sensed during the first scan, and a second set of the sensed point locations are sensed during the second scan. A first pair of adjacent sensed point locations from the first set is selected. A first imaginary line segment joining the first pair of adjacent sensed point locations has a first slope. A second pair of adjacent sensed point locations from the second set is selected. The first pair of adjacent sensed point locations has a position in a direction of the scanning that corresponds to a position of the second pair of adjacent sensed point locations in the direction of the scanning. A second imaginary line segment joining the second pair of adjacent sensed point locations has a second slope. One of the first pair of adjacent sensed point locations is represented in a map of the surface by an adjusted first sensed point location. A third imaginary line segment joins the adjusted first sensed point location and an other sensed point location of the first pair. The third imaginary line segment has a third slope. The third slope is closer to the second slope than is the first slope.

The invention comprises, in still another form thereof, a robotic mapping method including using a robot to sense locations of a plurality of points on a surface to be mapped. A first of the sensed point locations is represented in a map of the surface by an adjusted first sensed point location. The adjusted first sensed point location is dependent upon at least a second and a third of the sensed point locations.

An advantage of the present invention is that it reconstructs maps that are significantly more accurate than those produced by prior art algorithms. The maps produced by the present invention resemble the actual structure with a much higher level of detail. The geometric map representations that are used yield higher accuracy and scale better than grid maps. When applied to SLAM, the method of the invention finds maps that closely resemble the real environment. The inventive method is particularly superior to the prior art in cases in which no salient landmark definition is feasible.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2b is a diagram illustrating another step of the manifold prior of FIG. 2a.

FIG. 2c is a diagram illustrating yet another step of the manifold prior of FIG. 2a.

FIG. 3b is a diagram illustrating another step of the shape prior of FIG. 3a.

FIG. 3c is a diagram illustrating yet another step of the shape prior of FIG. 3a.

FIG. 4b is a diagram illustrating another step of the orientation prior of FIG. 4a.

FIG. 4c is a diagram illustrating yet another step of the orientation prior of FIG. 4a.

Figure 1B:
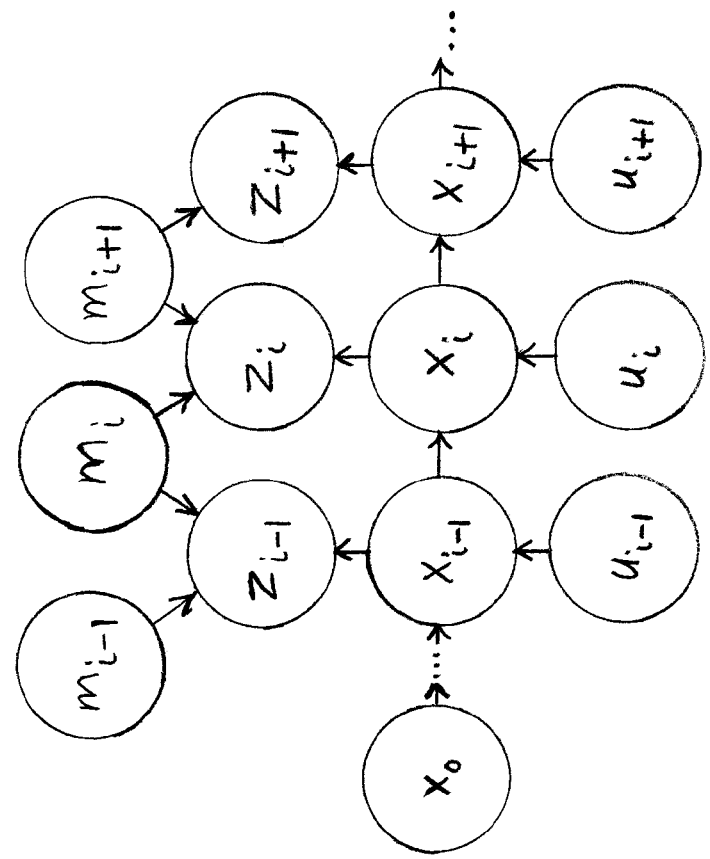
FIG. 1b is a network according to one embodiment of a mapping method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In the formulation of the present invention, some prior knowledge about map m is assumed to be available, and this knowledge may be used to reformulate the SLAM problem. First, according to the invention, the notion of landmarks may be eliminated. In prior art formulations, it is assumed that the correspondences $c_t^k$ are known beforehand, which enables a landmark $m_i$ to be uniquely assigned to each observed feature. However, in practical prior art SLAM implementations, this becomes a crucial step. It is very challenging to find the correct correspondences, and a single incorrect correspondence often causes a catastrophic failure. In the formulation of the present invention, the measurements are considered directly without processing them into any landmarks, the correspondence to such landmarks not being known. Instead, according to the invention, there is no immediate correspondence between measurements. In fact, this assumption may be accurate for a many situations. For example, a mobile robot equipped with LIDAR may take a finite number of measurements or "observations" while the robot is in motion. It is very unlikely that the robot ever observes the exact same location more than once.

The present invention has many differences from the SLAM formulations of the prior art, including:

Each observation $z_t^k$ creates a new feature in the map.

No correspondence is assumed between observations and known features.

Instead, the map prior p(m) is used to estimate the robot's pose and the map.

The new posterior for this formulation is:

$$p(x_{1:t}, m | u_{1:t}, z_{1:t}) = \eta p(x_0) p(m) \Pi_t [p(x_t | x_{t-1}, u_t) \Pi_i p(z_t^i | x_t, m)] \quad (5)$$

Figure 1A:
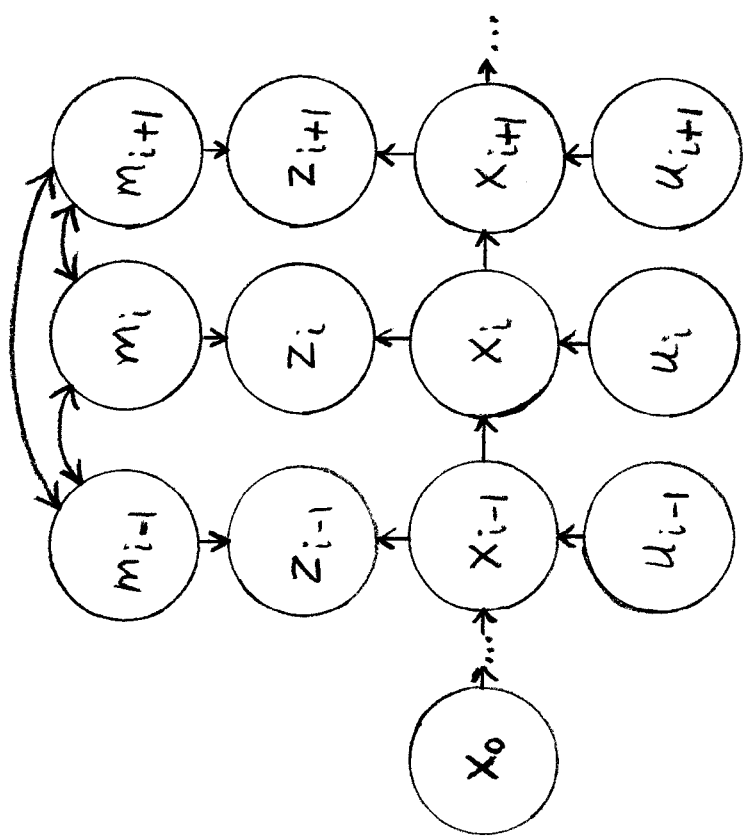
FIG. 1a is a diagram illustrating a Bayes network of landmark based SLAM of the prior art.

A graphical model of this formulation is illustrated in FIG. 1b which shows the network according to a method of the present invention. In contrast to the prior art method depicted in FIG. 1a, it is not assumed that map features are observed from different locations. Instead, the correlations between features are used to achieve a non-divergence property.

The different components of Equation (5) are now described in more detail. The probability distribution $p(x_t | x_{t-1}, u_t)$ for the motion model can also be expressed as a Gaussian distribution $$p(x_t | x_{t-1}, u_t) \propto \exp\left\{\frac{1}{2}(x_t - g(u_t, x_{t-1}))^T R_t^{-1}(x_t - g(u_t, x_{t-1}))\right\} \quad (6)$$

Here $g(u_t, x_{t-1})$ denotes a function that models the state transition. The common model is used where the robot is assumed to perform a rotation $\delta_{\phi,1}$ followed by a translation $\delta_t$, followed by another translation $\delta_{\phi,2}$:

$$g(u_t, x_{t-1}) = \begin{pmatrix} x_{t-1,x} \\ x_{t-1,y} \\ x_{t-1,\theta} \end{pmatrix} + \begin{pmatrix} \delta_t \cos(\theta + \delta_{\phi,1}) \\ \delta_t \sin(\theta + \delta_{\phi,1}) \\ \delta_{\phi,1} + \delta_{\phi,2} \end{pmatrix} \quad (7)$$

In this case, this function is a linear approximation of the true motion function $\bar{g}$ $$g(u_t, x_{t-1}) \approx \bar{g}(\bar{u}_t, \bar{x}_{t-1}) + G_t(x_{t-1} - \bar{x}_{t-1}) \quad (8)$$

at the expected pose $\tilde{x}_{t-1}$ and with the control parameters $\tilde{u}_t$. The Jacobian $G_t$ is the derivative of the function $\bar{g}$ with respect to $x_{t-1}$.

For exact motion, the incremental travel distance in the time interval $\Delta t$ between any two poses $$u_t = \begin{pmatrix} x' - x \\ y' - y \\ \theta' - \theta \end{pmatrix} = \begin{pmatrix} \delta_x \\ \delta_y \\ \delta_\theta \end{pmatrix} \quad (9)$$

is represented by a concatenation of three basic motions: a rotation $\delta_{\phi,1}$, a straight-line motion $\delta_t$, and another rotation $\delta_{\phi,2}$ $$\delta_{\phi,1} = a\tan 2(\delta_y - \delta_x) \quad (10)$$

$$\delta_t = \sqrt{\delta_x^2 + \delta_y^2} \quad (11)$$

$$\delta_{\phi,2} = \delta_\theta - \delta_{\phi,1} \quad (12)$$

Consequently, the true position after one timestamp $\Delta t$ can be obtained by $$\begin{pmatrix} x' \\ y' \\ \theta' \end{pmatrix} = \begin{pmatrix} x \\ y \\ \theta \end{pmatrix} + \begin{pmatrix} \delta_t \cos(\theta + \delta_{\phi,1}) \\ \delta_t \sin(\theta + \delta_{\phi,1}) \\ \delta_{\phi,1} + \delta_{\phi,2} \end{pmatrix} \quad (13)$$

$$= \begin{pmatrix} x \\ y \\ \theta \end{pmatrix} + \begin{pmatrix} \sqrt{\delta_x^2 + \delta_y^2}\cos(\theta + \operatorname{atan2}(\delta_y - \delta_x)) \\ \sqrt{\delta_x^2 + \delta_y^2}\sin(\theta + \operatorname{atan2}(\delta_y - \delta_x)) \\ \delta_\theta \end{pmatrix} \quad (14)$$

In actuality, real platform motion is subject to noise. The values of the rotations and the translation are disturbed by independent noise. According to the invention, this noise may be modeled by a zero-centered random variable with finite variance. It may be assumed that the actual incremental travel distances are given by $$\begin{pmatrix} \hat{\delta}_{\phi,1} \\ \hat{\delta}_t \\ \hat{\delta}_{\phi,2} \end{pmatrix} = \begin{pmatrix} \delta_{\phi,1} \\ \delta_t \\ \delta_{\phi,2} \end{pmatrix} + \begin{pmatrix} \varepsilon_{\alpha_1|\delta_{\phi,1}|+\alpha_2|\delta_t|} \\ \varepsilon_{\alpha_3|\delta_t|+\alpha_4|\delta_{\phi,1}+\delta_{\phi,2}|} \\ \varepsilon_{\alpha_1|\delta_{\phi,2}|+\alpha_2|\delta_t|} \end{pmatrix} = \begin{pmatrix} \delta_{\phi,1} \\ \delta_t \\ \delta_{\phi,2} \end{pmatrix} + \mathcal{N}(0, M_t). \quad (15)$$

Here $\varepsilon_\sigma$ is a zero-mean, normal distributed error variable with standard deviation $\sigma$.

$$\varepsilon_\sigma(x) = \frac{1}{\sqrt{2\pi\sigma^2}} e^{-\frac{1}{2}\frac{x^2}{\sigma^2}} \quad (16)$$

and $M_t$ is the noise covariance matrix in motion space $$M_t = \quad (17)$$
$$\begin{pmatrix} (\alpha_1|\delta_{\phi,1}| + \alpha_2|\delta_t|)^2 & 0 & 0 \\ 0 & (\alpha_3|\delta_t| + \alpha_4|\delta_{\phi,1}+\delta_{\phi,2}|)^2 & 0 \\ 0 & 0 & (\alpha_1|\delta_{\phi,2}| + \alpha_2|\delta_t|)^2 \end{pmatrix}.$$

In the model of the present invention, the standard deviation of the error may be proportional to the rotations and the translation. The parameters $\alpha_1$, $\alpha_2$, $\alpha_3$ and $\alpha_4$ are platform-specific error parameters. A better model of the actual pose after a time interval $\Delta t$ is thus $$\begin{pmatrix} x' \\ y' \\ \theta' \end{pmatrix} = \begin{pmatrix} x \\ y \\ \theta \end{pmatrix} + \begin{pmatrix} \hat{\delta}_t \cos(\theta + \hat{\delta}_{\phi,1}) \\ \hat{\delta}_t \sin(\theta + \hat{\delta}_{\phi,1}) \\ \hat{\delta}_{\phi,1} + \hat{\delta}_{\phi,2} \end{pmatrix} \quad (18)$$

For further use, the motion model may be linearized. For that, the model may be decomposed into a noise-free part and a random noise component $$\underbrace{\begin{pmatrix} x' \\ y' \\ \theta' \end{pmatrix}}_{x_t} = \underbrace{\begin{pmatrix} x \\ y \\ \theta \end{pmatrix}}_{x_{t-1}} + \underbrace{\begin{pmatrix} \delta_t \cos(\theta + \delta_{\phi,1}) \\ \delta_t \sin(\theta + \delta_{\phi,1}) \\ \delta_{\phi,1} + \delta_{\phi,2} \end{pmatrix}}_{g(u_t, x_{t-1})} + \mathcal{N}(0, R_t). \quad (19)$$

Equation 19 approximates Equation 18 by replacing the true motion $(\hat{\delta}_{\phi,1}\ \hat{\delta}_t\ \hat{\delta}_{\phi,2})^T$ by the measured motion $(\delta_{\phi,1}\ \delta_t\ \delta_{\phi,2})$ and capturing the motion noise in an additive Gaussian with zero mean. The function g may be approximated through a Taylor expansion $$g(u_t, x_{t-1}) \approx g(\tilde{u}_t, \tilde{x}_{t-1}) + G_t(x_{t-1} - \tilde{x}_{t-1}) \quad (20)$$

The Jacobian $G_t$ is the derivative of the function g with respect to $x_{t-1}$ at the expected pose $\tilde{x}_{t-1} = (\tilde{x}\ \tilde{y}\ \tilde{\theta})^T$ and with the expected motion parameters $\tilde{u}_t\ (\hat{\delta}_{\phi,i}\ \hat{\delta}_t\ \hat{\delta}_{\phi,2})^T$ $$G_t = \frac{\partial g(\tilde{u}_t, \tilde{x}_{t-1})}{\partial x_{t-1}} = \begin{pmatrix} \frac{\partial g_{x'}}{\partial \tilde{x}} & \frac{\partial g_{x'}}{\partial \tilde{y}} & \frac{\partial g_{x'}}{\partial \tilde{\theta}} \\ \frac{\partial g_{y'}}{\partial \tilde{x}} & \frac{\partial g_{y'}}{\partial \tilde{y}} & \frac{\partial g_{y'}}{\partial \tilde{\theta}} \\ \frac{\partial g_{\theta'}}{\partial \tilde{x}} & \frac{\partial g_{\theta'}}{\partial \tilde{y}} & \frac{\partial g_{\theta'}}{\partial \tilde{\theta}} \end{pmatrix} \quad (21)$$

$$= \begin{pmatrix} 1 & 0 & -\tilde{\delta}_t \sin(\tilde{\theta} + \tilde{\delta}_{\phi,1}) \\ 0 & 1 & \tilde{\delta}_t \cos(\tilde{\theta} + \tilde{\delta}_{\phi,1}) \\ 0 & 0 & 1 \end{pmatrix}. \quad (22)$$

The motion model in Equation 19 may require the motion noise $M_t$ to be mapped into "state space." This may once again be done by linear approximation. The Jacobian needed for this approximation, denoted $V_t$, is the derivative of the function g with respect to the motion parameters $u_t$ at the expected pose $\tilde{x}_{t-1} = (\tilde{x}\ \tilde{y}\ \tilde{\theta})^T$ and with the expected motion parameters $\tilde{u}_t(\hat{\delta}_{\phi,1}\ \hat{\delta}_t\ \hat{\delta}_{\phi,2})^T$ $$V_t = \frac{\partial g(\tilde{u}_t, \tilde{x}_{t-1})}{\partial \tilde{u}_t} = \begin{pmatrix} \frac{\partial g_{x'}}{\partial \tilde{\delta}_{\phi,1}} & \frac{\partial g_{x'}}{\partial \tilde{\delta}_t} & \frac{\partial g_{x'}}{\partial \tilde{\delta}_{\phi,2}} \\ \frac{\partial g_{y'}}{\partial \tilde{\delta}_{\phi,1}} & \frac{\partial g_{y'}}{\partial \tilde{\delta}_t} & \frac{\partial g_{y'}}{\partial \tilde{\delta}_{\phi,2}} \\ \frac{\partial g_{\theta'}}{\partial \tilde{\delta}_{\phi,1}} & \frac{\partial g_{\theta'}}{\partial \tilde{\delta}_t} & \frac{\partial g_{\theta'}}{\partial \tilde{\delta}_{\phi,2}} \end{pmatrix} \quad (23)$$

$$= \begin{pmatrix} -\tilde{\delta}_t \sin(\tilde{\theta}+\tilde{\delta}_{\phi,1}) & \cos(\tilde{\theta}+\tilde{\delta}_{\phi,1}) & 0 \\ \tilde{\delta}_t \cos(\tilde{\theta}+\tilde{\delta}_{\phi,1}) & \sin(\tilde{\theta}+\tilde{\delta}_{\phi,1}) & 0 \\ 1 & 0 & 1 \end{pmatrix} \quad (24)$$

Finally, the approximate mapping between the motion noise in motion space to the motion noise in state space is derived by the multiplication $$R_t = V_t M_t V_t^T. \quad (25)$$

The probability distribution $p(z_t^i | x_t, m)$ for the observation model can also be expressed as Gaussian distribution $$p(z_t^i | x_t, m_i) \propto \exp\left\{\frac{1}{2}(z_t^i - h(x_t, m_i))^T Q_{t,i}^{-1}(z_t^i - h(x_t, m_i))\right\} \quad (26)$$

wherein $h(x_t, m)$ denotes a function that models the observation $z_t^i$. A beam model may be used for sensors that measure range in different directions:

$$h(x_t, m_i) = \begin{pmatrix} \sqrt{(m_{i,x}-x_{t,x})^2 + (m_{i,y}-x_{t,y})^2} \\ \text{atan2}(m_{i,y}-x_{t,y}, m_{i,x}-x_{t,x}) - x_{t,\theta} \end{pmatrix} \quad (27)$$

Again, this function is a linear approximation of the true measurement function $\bar{h}$ $$h(x_t, m_i) \approx \bar{h}(\tilde{x}_t, \tilde{m}_i) + H_{t,i} \begin{pmatrix} x_t - \tilde{x}_t \\ m_i - \tilde{m}_i \end{pmatrix} \quad (28)$$

at the expected pose $\tilde{x}_t$ and observing the expected feature $\tilde{m}_i$. The Jacobian $H_{t,i}$ is the derivative of the function $\bar{h}$ with respect to $x_t$ and $m_i$.

A sensor may measure the two-dimensional coordinates of a surface $$m_n = \begin{pmatrix} m_x \\ m_y \end{pmatrix}, \quad (29)$$

where $x_m$ and $y_m$ are the true coordinates in a global coordinate system. The beam model approximates the physical model of range finders. Range finders measure the range $r_m$ along a beam, which originates at the local coordinate system of the sensor. The angular orientation of the sensor beam is denoted as $\theta_m$ $$z_t^k = \begin{pmatrix} r_m \\ \theta_m \end{pmatrix} \quad (30)$$

The endpoint of this measurement is mapped into the global coordinate system via the trigonometric transformation $$\begin{pmatrix} r_m \\ \theta_m \end{pmatrix} = \begin{pmatrix} \sqrt{(m_x-x)^2 + (m_y-y)^2} \\ \text{atan2}(m_y-y, m_x-x) \end{pmatrix} \quad (31)$$

where $x_t = (x\ y\ \theta)^T$ denotes the pose of the sensing platform in global coordinates.

In actuality, real measurements are subject to noise. The values of the range and the angular orientation are disturbed by independent noise. This noise may be modeled by a zero-centered random variable with finite variance. Assuming that the actual measurements are given by $$\begin{pmatrix} \hat{r}_m \\ \hat{\theta}_m \end{pmatrix} = \begin{pmatrix} r_m \\ \theta_m \end{pmatrix} + \begin{pmatrix} \varepsilon_{\alpha_1} \\ \varepsilon_{\alpha_2} \end{pmatrix} = \begin{pmatrix} r_m \\ \theta_m \end{pmatrix} + \mathcal{N}(0, Q_t) \quad (32)$$

and $Q_t$ is the noise covariance matrix in "measurement space"

$$Q_t = \begin{pmatrix} \alpha_1^2 & 0 \\ 0 & \alpha_2^2 \end{pmatrix}. \quad (33)$$

A better model of the actual measurement is thus $$z_t^k = \begin{pmatrix} \hat{r}_m \\ \hat{\theta}_m \end{pmatrix} = \underbrace{\begin{pmatrix} \sqrt{(m_x-x)^2 + (m_y-y)^2} \\ \text{atan2}(m_y-y, m_x-x) - \theta \end{pmatrix}}_{h(m_n, x_t)} + \mathcal{N}(0, Q_t) \quad (34)$$

For further use, the measurement model may be linearized. The function h may be approximated through a Taylor expansion $$h(m_n, x_t) \approx h(\tilde{m}_n, \tilde{x}_t) + H_t \begin{pmatrix} x - \tilde{x} \\ y - \tilde{y} \\ \theta - \tilde{\theta} \\ m_x - \tilde{m}_x \\ m_y - \tilde{m}_y \end{pmatrix}. \quad (35)$$

The Jacobian $H_t$ is the derivative of the function h with respect to $x_t$ at the current pose estimate $\tilde{x}_t = (\tilde{x}\ \tilde{y}\ \tilde{\theta})^T$ and the surface estimate $\tilde{m}_t = (\tilde{m}_x\ \tilde{m}_y)^T$ $$H_t = \frac{\partial h(\tilde{m}_n, \tilde{x}_t)}{\partial m_n, x_t} = \begin{pmatrix} \frac{\partial \hat{r}_m}{\partial \tilde{x}} & \frac{\partial \hat{r}_m}{\partial \tilde{y}} & \frac{\partial \hat{r}_m}{\partial \tilde{\theta}} & \frac{\partial \hat{r}_m}{\partial \tilde{m}_x} & \frac{\partial \hat{r}_m}{\partial \tilde{m}_y} \\ \frac{\partial \hat{\theta}_m}{\partial \tilde{x}} & \frac{\partial \hat{\theta}_m}{\partial \tilde{y}} & \frac{\partial \hat{\theta}_m}{\partial \tilde{\theta}} & \frac{\partial \hat{\theta}_m}{\partial \tilde{m}_x} & \frac{\partial \hat{\theta}_m}{\partial \tilde{m}_y} \end{pmatrix} \quad (36)$$

$$= \frac{1}{q}\begin{pmatrix} \sqrt{q}\hat{\delta}_x & -\sqrt{q}\hat{\delta}_y & 0 & -\sqrt{q}\hat{\delta}_x & \sqrt{q}\hat{\delta}_y \\ \hat{\delta}_y & \hat{\delta}_x & -q & -\hat{\delta}_y & -\hat{\delta}_x \end{pmatrix} \quad (37)$$

$$(38)$$

$$(39)$$

with $q=\hat{\delta}_x^2+\hat{\delta}_y^2$, $\hat{\delta}_x=\tilde{m}_x-\tilde{x}$, and $\hat{\delta}_y=\tilde{m}_y-\tilde{y}$.

The prior $p(x_0)$ may anchor the first pose at its position (e.g., the origin of the global coordinate system). The prior is easily expressed by a Gaussian-type distribution $$p(x_0) = \eta \exp\left\{\frac{1}{2}(x_0 - \tilde{x}_0)^T \Omega_0^{-1}(x_0 - \tilde{x}_0)\right\} \quad (40)$$

wherein $\tilde{x}_0$ is the initial estimate of the first pose. The covariance $\Omega_0$ is a simple matrix with values close to zero on the diagonal and zero everywhere else.

The probability distribution $p(m)$ in Equation (5) represents a prior distribution of all measured scenes. An exact probabilistic model of this distribution may be infeasible and probably not even well defined. Hence, the focus of the present invention may be on partial models, which represent properties of the surface structure. For the optimization of Equation (5), a good surface prior may be very beneficial. The observation model, the motion model, as well as the prior on the first pose are at their equilibrium by using the measurements. This means that without any map prior, the most probable solution would be the measurement itself. The present invention uses priors representing three properties: manifold priors, smoothness priors and priors for the orientation. It may be assumed that all three priors are independent of each other, which leads to:

$$p(m) = p_m(m) p_s(m) p_o(m) \quad (41)$$

The independence assumption is most likely not true and is a good starting point for further improvements. It has been found empirically that even though this assumption is violated, the method of the present invention yields good results.

Figure 2A:
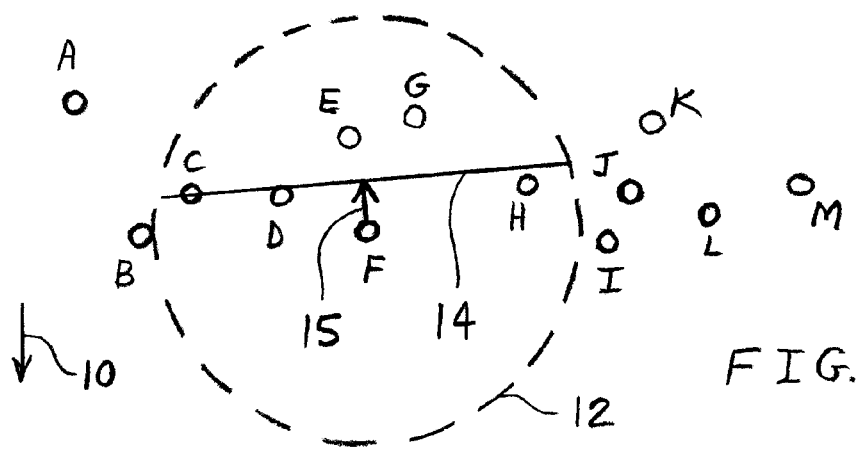
FIG. 2a is a diagram illustrating one step of one embodiment of a manifold prior utilized in a mapping method of the present invention.
Figure 2B:
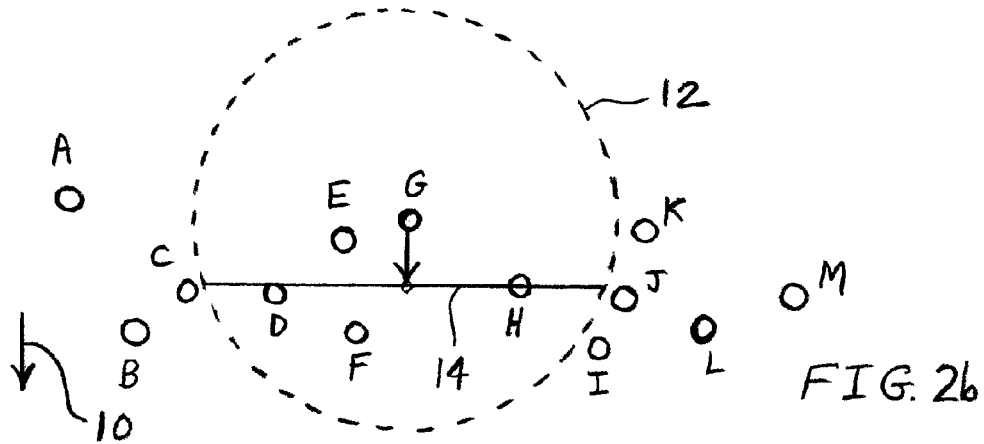
Figure 2C:
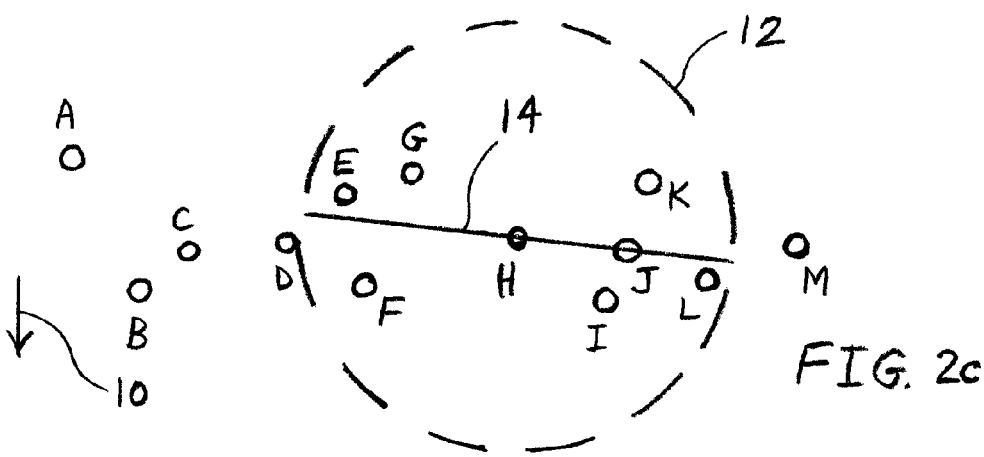
Figure 3A:
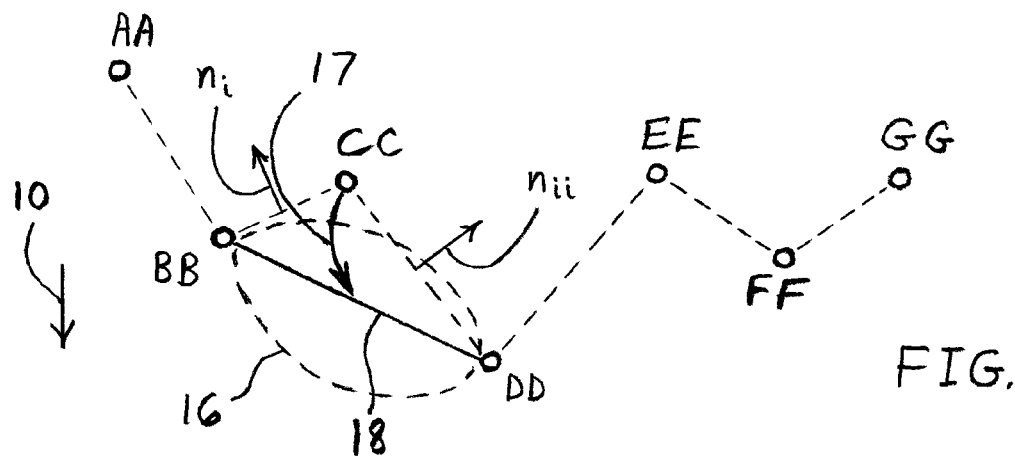
FIG. 3a is a diagram illustrating one step of one embodiment of a shape prior utilized in a mapping method of the present invention.
Figure 3B:
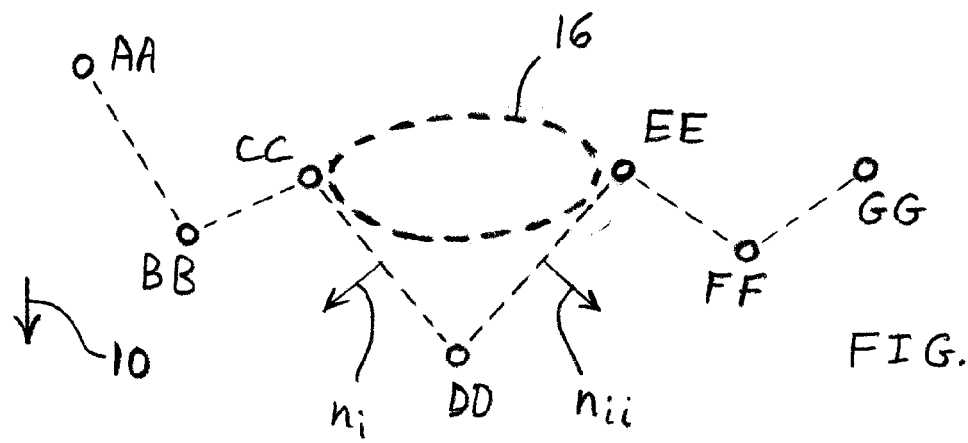
Figure 3C:
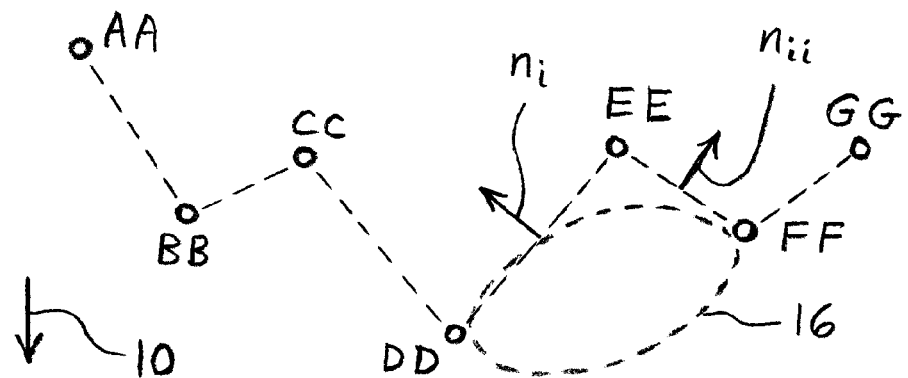
Figure 4A:
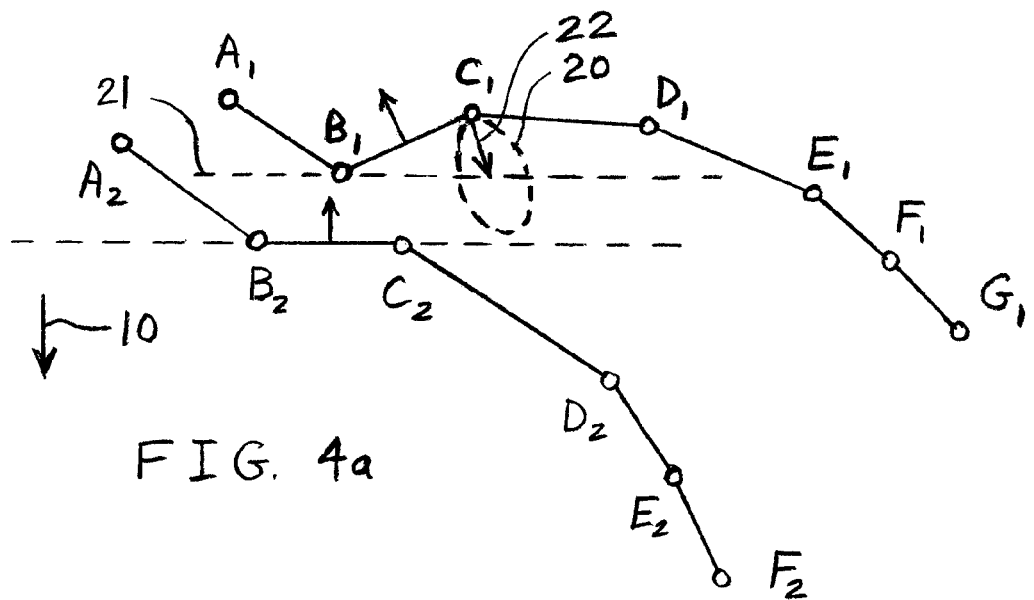
FIG. 4a is a diagram illustrating one step of one embodiment of an orientation prior utilized in a mapping method of the present invention.
Figure 4B:
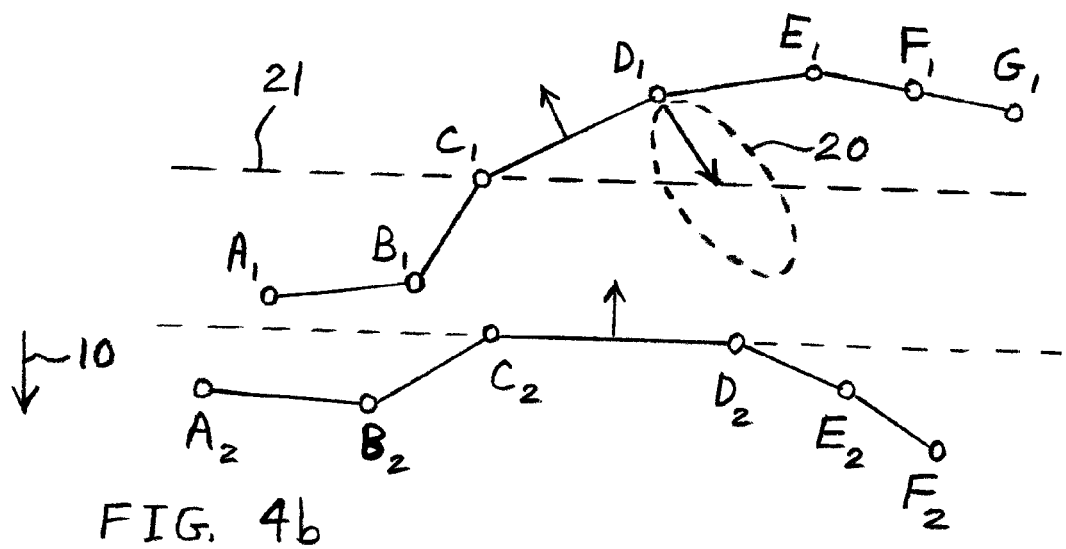
Figure 4C:
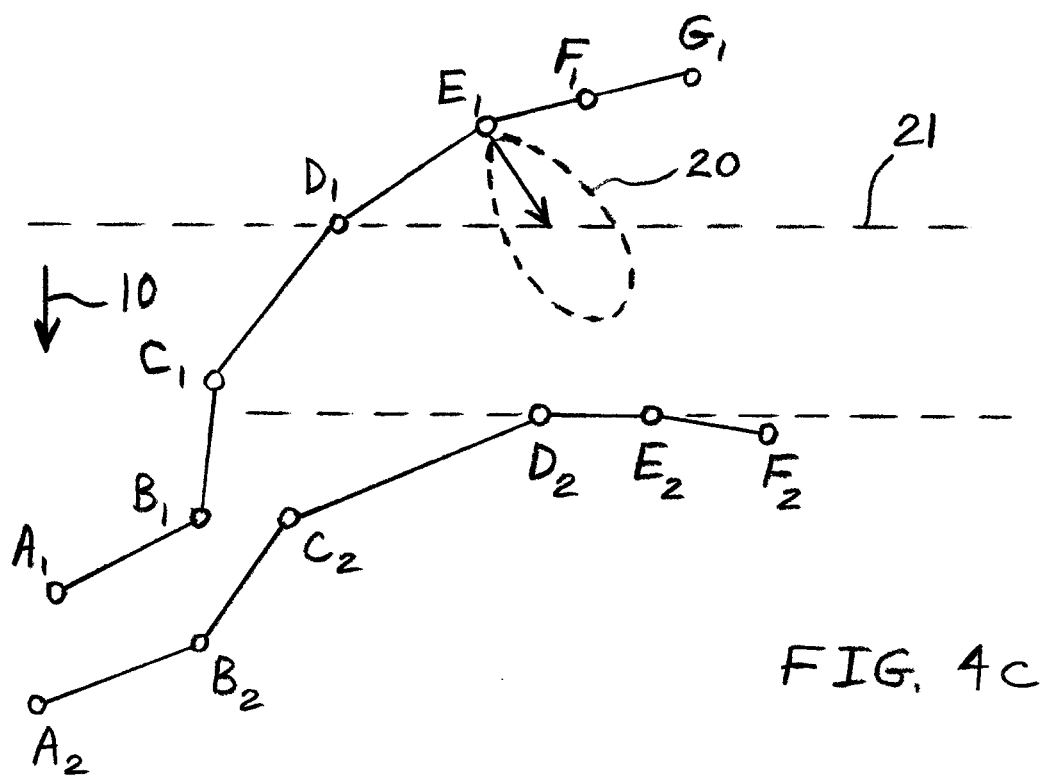

The three types of priors (i.e., manifold, smoothness and orientation) are described in detail hereinbelow. In FIGS. 2-4, there are shown specific embodiments of the three different types of priors that may be utilized according to mapping methods of the present invention. More particularly, a manifold prior is illustrated in FIGS. 2a-c; a shape prior is illustrated in FIGS. 3a-c; and an orientation prior is illustrated in FIGS. 4a-c. Each of the three priors is shown in FIGS. 2-4 as being applied to three consecutive observed readings in order to present an illustrative sample. However, it is to be understood that these priors may be applied to each available reading that has been observed. Moreover, any combination of the three types of priors may be applied to the same set of data.

The intuition of the manifold prior is that the collected observations belong to surfaces in the robot's environment. For a two-dimensional map, this means that the most probable surface must be a compact, connected, one-dimensional manifold, possibly with a boundary embedded in $\mathbb{R}^2$.

FIG. 2a includes a number of circles A-M each of which represents a respective observation or measurement of a surface location by a robot as the robot traverses the surface. It is possible that circles A-M are the result of observations taken in a single scan or in multiples scans or trips of the robot across the surface. It is also possible that circles A-M are the result of observations taken while the robot moves at an angle, or even randomly, with respect to the surface. Thus, there may be noise in observation points A-M due to uncertainty in matching up the positions of the robot in the x-direction (i.e., in the direction across the page of FIG. 2a) when the robot made the observations. The surface may be substantially perpendicular to the page of FIG. 2a, and the robot may be displaced from the wall in the general direction of arrow 10.

Each of observation points A-M may be in the same plane, as shown in FIG. 2a. The map, the path of the robot, and the observations may be purely two-dimensional. That is, the offsets may be in only the x and y directions, i.e., in the plane of the page. Although each of observation points A-M may have its measured location adjusted according to the manifold prior technique as described below, FIG. 2a more particularly illustrates an adjustment of point F, which is arbitrarily selected for purposes of the initial illustration.

A fixed neighborhood of point F may be defined by a circle 12 having point F at the center of circle 12. The radius of circle 12 may be variable within the scope of the invention, and the inventive manifold technique is not limited to use of circles of any particular radius. However, in one embodiment, there are approximately between ten and twenty points within circle 12. Moreover, a point's neighborhood may be defined by shapes other than circular within the scope of the invention. The points within the neighborhood, i.e. points C, D, E, F, G, and H within circle 12, may be used to create a best fit line 14, such as a least squares regression line. That is, line 14 may be calculated as the line that minimizes the sum of the squares of the distances of each of points C, D, E, F, G, and H to the line.

The distribution of points C, D, E, F, G, and H around line 14 may be modeled as a Gaussian distribution over the projected distance to the tangent line. That is, the Gaussian distribution may have its peak value at line 14, and the distribution values may decline in directions outwardly away from (i.e., perpendicular to) line 14. The most probable arrangement regarding only this manifold prior is when all points are located on the same one-dimensional manifold.

According to the present invention, point F may be moved closer to line 14, and in a direction 15 perpendicular to line 14, in the final mapping. Thus, the location of point F after movement may be substantially aligned with its original location in the vertical direction. The degree to which, or distance by which, point F is moved toward line 14 may be variable according to the invention, and the invention is not intended to be limited to any particular method of determining the amount of movement of point F toward line 14. In a specific embodiment, however, point F is moved toward line 14 by a variable amount that is governed by the Gaussian distribution. Thus, the closer a possible final destination is to line 14, the more likely it is that point F will actually be moved to that final destination.

A normal $n_i$ may be represented by an arrow superimposed on arrow 15 but pointing in the opposite direction. This normal $n_i$ may be determined using principal component analysis. The eigenvector with the smallest eigenvalue may correspond to the normal $n_i$. The projected distance $d_i$ of the point onto its tangent line is defined by the dot product:

$$d_i = (m_i - o_i) \cdot n_i. \quad (42)$$

wherein point $o_i$ is the point at which the normal $n_i$ begins on tangent line 14. Now a Gaussian type manifold prior can be defined of the form:

$$p_m(m) = \eta_m \prod_i \exp\left\{-\frac{d_i^2}{2\sigma_m}\right\}, \quad (43)$$

where $\sigma_m$ is the variance of tangent line distances and $\eta_m = \Pi_i (\sigma_m \sqrt{2\pi})^{-1}$ is a normalizer which subsumes all constant factors.

FIGS. 2b and 2c illustrate adjustments of observation points G and H, respectively, with circle 12 being re-centered on each of these points G and H. The details of these adjustments may be substantially similar to the adjustment of point F, and thus are not described in detail herein in order to avoid needless repetition. Illustrated in FIG. 2c is the case wherein point H as observed happens to be located on or very near to line 14. In this case, point H may not be adjusted, or may be adjusted only a very small distance.

Although the adjustments of points F, G and H are presented sequentially in FIGS. 2*a-c*, adjustments of the individual points may be performed simultaneously, i.e., at the same time, via use of a Conjugate Gradient optimizer. If another optimizer is used, such as a Stochastic Gradient Descent optimizer, adjustments of the individual points may be performed sequentially or randomly. This flexibility in the order of adjustment may be due to the adjustment of each point being performed independently of the adjustment of any other point. That is, each point may be adjusted based upon the original positions of the other points as actually observed, rather than being based upon the adjusted positions of the other points. As a specific example, point G may be adjusted in FIG. 2*b* based upon point F's original, unadjusted position in FIG. 2*a*. However, adjustment of each point based upon the original positions of the other points may occur within only one iteration of the optimization. Once all points are adjusted, the new, adjusted positions may be used as inputs for the next iteration.

The above-described manifold prior models the probability that observations belong to the same surface purely based on distance. The shape prior, in contrast, exploits the natural local smoothness of surfaces. The smoothness is a function of a surface's curvature. Let $m_i$ and $m_j$ be neighbors on the same surface. The normal on the surface patch is defined by $$n_k = \frac{(m_j - m_i)^\perp}{\|m_j - m_i\|} = \underbrace{\begin{pmatrix} 0 & -1 \\ 1 & 0 \end{pmatrix}}_{:=M_\perp} \frac{(m_j - m_i)}{\|m_j - m_i\|} \quad (44)$$

Let $n_i$ and $n_{ii}$ be two adjacent normals on the surface. Then the shape prior has the form of a sub-quadratic normal distribution $$p_m(m) = \frac{1}{\eta_m} \prod_k \exp\left\{ -\frac{1}{2} \sqrt{(n_{ii} - n_i)^T \Omega_m (n_{ii} - n_i)} \right\} \quad (45)$$

Here $\Omega_m$ corresponds to a covariance matrix for smooth surfaces. Again $\eta_m$ is a constant, which is the integral over all other factors and therefore normalizes $p_m$ to be a probability density function. Sub-quadratic priors are used due to their ability to enhance features.

The properties of this shape prior are demonstrated in FIGS. 3*a-c*. The prior prefers arrangements where the normals of adjacent surface patches are similar. In fact, the properties of this prior are quite similar to the ones of the manifold prior. The main difference is that the shape is defined much more locally.

The shape prior technique illustrated in FIGS. 3*a-c* may model the local smoothness of natural surfaces. Two adjacent normals on a surface are more likely to be similar, thus the distance of normals is modeled as a sub-quadratic normal probabilistic distribution. The resulting distributions are indicated by the oval areas 16 in FIGS. 3*a-c*. These oval-shaped distributions may have a peak values in the centers of ovals 16, and the values may decrease in all outward directions away from the centers.

FIG. 3*a* includes a number of circles AA-GG each of which represents a respective observation or measurement of a surface location by a robot as the robot traverses the surface. Circles AA-GG may be the result of observations taken in a single scan or trip of the robot across the surface. Thus, observation points AA-GG may not have the noise in their locations that may result from being sensed in multiple scans. The surface may be substantially perpendicular to the page of FIG. 3*a*, and the robot may be displaced from the wall in the general direction of arrow 10.

Each of observation points AA-GG may be in the same plane, as shown in FIG. 3*a*. The map, the path of the robot, and the observations may be purely two-dimensional. That is, the offsets may be in only the x and y directions, i.e., in the plane of the page. Although each of observation points AA-GG may have its measured location adjusted according to the shape prior technique as described below, FIG. 3*a* more particularly illustrates an adjustment of point CC, which is arbitrarily selected for purposes of the initial illustration.

Point CC may be moved in a direction 17 generally toward a line 18 joining the two adjacent observation points BB and DD. The degree to which, or distance by which, point CC is moved toward line 18 may be variable according to the invention, and the invention is not intended to be limited to any particular method of determining the amount of movement of point CC toward line 18. In a specific embodiment, however, point CC is moved toward line 18 by a variable amount that is governed by the sub-quadratic normal distribution represented by oval 16 and having peak values near line 18. Thus, the closer a possible final destination is to line 18, the more likely it is that point CC will actually be moved to that final destination. The greater the distance between point CC and line 18, the slower the drop off in distribution values away from line 18 may be. That is, the greater the distance between point CC and line 18, the flatter the distribution represented by oval 16.

FIGS. 3*b* and 3*c* illustrate adjustments of observation points DD and EE, respectively, with respective oval distributions 16 being disposed between adjacent points CC and EE in FIG. 3*b*, and between adjacent points DD and FF in FIG. 3*c*. The details of these adjustments may be substantially similar to the adjustment of point CC, and thus are not described in detail herein in order to avoid needless repetition.

Although the adjustments of points CC, DD and EE are presented sequentially in FIGS. 3*a-c*, adjustments of the individual points may be performed simultaneously, i.e., at the same time, via use of a Conjugate Gradient optimizer. If another optimizer is used, such as a Stochastic Gradient Descent optimizer, adjustments of the individual points may be performed sequentially or randomly. This flexibility in the order of adjustment may be due to the adjustment of each point being performed independently of the adjustment of any other point. That is, each point may be adjusted based upon the original positions of the other points as actually observed, rather than being based upon the adjusted positions of the other points. As specific examples, point DD may be adjusted in FIG. 3*b* based upon point CC's original, unadjusted position in FIG. 3*a*; and point EE may be adjusted in FIG. 3*c* based upon point DD's original, unadjusted position in FIGS. 3*a* and 3*b*. However, adjustment of each point based upon the original positions of the other points may occur within only one iteration of the optimization. Once all points are adjusted, the new, adjusted positions may be used as inputs for the next iteration.

As is evident from a comparison of the manifold prior technique with the shape prior technique, the shape prior is affected more by local or nearby measurements. That is, the shape prior sub-quadratic normal distribution may be defined by only the two closest points, while the manifold prior Gaussian distribution may be defined by a greater number of points existing in the neighborhood of the point being adjusted.

The third prior that may be used according to the present invention is directed to the orientation of adjacent surface patches. If two surface patches such as the ones shown in each of FIGS. 4a-c belong to the same physical surface, then the orientation of edges representing the same portion may have a similar orientation. Once again this can be modeled as a probability distribution as follows: Let $n_i$ and $n_j$ be two corresponding normals on two surface patches. Then the orientation prior has the form of a quadratic normal distribution $$p_m(m) = \frac{1}{\eta_o} \prod_k \exp\left\{-\frac{1}{2}\sqrt{(n_j - n_i)^T \Omega_o (n_j - n_i)}\right\} \quad (46)$$

Here $\Omega_O$ corresponds to a covariance matrix for the orientation of adjacent surfaces. Again $\eta_O$ is a constant, which is the integral over all other factors and therefore normalizes $p_O$ to be a probability density function. The resulting probability density function is represented by oval areas 20 in FIGS. 4a-c.

The orientation prior illustrated in FIGS. 4a-c uses the orientation of adjacent surface patches. The differences between two corresponding normals are modeled as quadratic normal distributions. The resulting distributions are indicated by the oval areas 20 in FIGS. 4a-c. These oval-shaped distributions may have a peak values in the centers of ovals 20, and the values may decrease in all outward directions away from the centers.

FIG. 4a includes a first set of circles $A_1$-$G_1$ each of which represents a respective observation or measurement of a surface location by a robot as the robot traverses the surface in a first scan in a direction generally across the page of FIG. 4a. FIG. 4a also includes a second set of circles $A_2$-$F_2$ each of which represents a respective observation or measurement of a surface location by a robot as the robot traverses the surface in a second scan in a direction generally from the left-hand side to the right-hand side in FIG. 4a. Thus, observation points $A_1$-$G_1$ and $A_2$-$F_2$ may not have the noise in their locations that may result from being sensed in multiple scans. The surface may be substantially perpendicular to the page of FIG. 4a, and the robot may be displaced from the wall in the general direction of arrow 10.

The respective strips of surface area that are scanned to produce respective sets of observation points $A_1$-$G_1$ and $A_2$-$F_2$ may be effectively the same strip of surface area. However, it is possible that the sets of observation points $A_1$-$G_1$ and $A_2$-$F_2$ are offset relative to each other in the x-direction across the page of FIG. 4a.

The two sets of observation points $A_1$-$G_1$ and $A_2$-$F_2$ are shown in each of FIGS. 4a-c as being separated from each other by an arbitrary distance in the y-direction. However, for purposes of the orientation prior technique, this separation distance in the y-direction is of no consequence. The angular orientation between the two sets of observation points $A_1$-$G_1$ and $A_r$-$F_2$, however, does affect the operation of the orientation prior technique. The angular orientation between the two sets of observation points $A_1$-$G_1$ and $A_2$-$F_2$ may be established by any method within the scope of the invention (e.g., by a least squares method). However, in the illustrated embodiment, the angular orientation between the two sets of observation points $A_1$-$G_1$ and $A_2$-$F_2$ once established may be held constant for the adjustment of each observation point. That is, although the first set of observation points $A_1$-$G_1$ is illustrated with different angular orientations in each of FIGS. 4a-c, and likewise the second set of observation points $A_2$-$F_2$ is illustrated with different angular orientations in each of FIGS. 4a-c, the orientation of the first set of observation points $A_1$-$G_1$ relative to the orientation of the second set of observation points $A_2$-$F_2$ may be held constant in each of FIGS. 4a-c and for each point adjustment.

Each of observation points $A_1$-$G_1$ and $A_2$-$F_2$ may be in the same plane, as shown in FIG. 4a. The map, the path of the robot, and the observations may be purely two-dimensional. That is, the offsets may be in only the x and y directions, i.e., in the plane of the page. Although each of observation points $A_1$-$G_1$ may have its measured location adjusted according to the orientation prior technique as described below, FIG. 4a more particularly illustrates an adjustment of point $C_1$, which is arbitrarily selected for purposes of the initial illustration.

An adjustment of point $C_1$ may include selecting a line segment of the second set of observation points $A_2$-$F_2$ that corresponds to the line segment that joins points $B_1$ and $C_1$. The scope of the invention may encompass any method of selecting such a corresponding line segment. However, the corresponding line segment may be selected as one that has the closest position to the first line segment in the x-direction. In the embodiment of FIG. 4a, the line segment joining points $B_2$ and $C_2$ is selected as the line segment corresponding to the line segment that joins points $B_1$ and $C_1$.

Next, an imaginary line 21 that intersects point $B_1$ and that is parallel to the line segment joining points $B_2$ and $C_2$ is determined. As an adjustment, point $C_1$ may be moved toward line 21 in a direction 22 that is generally perpendicular to the line segment joining observation points $B_1$ and $C_1$. The degree to which, or distance by which, point $C_1$ is moved toward line 21 may be variable according to the invention, and the invention is not intended to be limited to any particular method of determining the amount of movement of point $C_1$ toward line 21. In a specific embodiment, however, point $C_1$ is moved toward line 21 by a variable amount that is governed by the quadratic normal distribution represented by oval 20 and having peak values near line 21. Thus, the closer a possible final destination is to line 21, the more likely it is that point $C_1$ will actually be moved to that final destination. The greater the distance between point $C_1$ and line 21, the slower the drop off in distribution values away from line 21 may be. That is, the greater the distance between point $C_1$ and line 21, the flatter the distribution represented by oval 20.

FIGS. 4b and 4c illustrate adjustments of observation points $D_1$ and $E_1$, respectively, with respective oval distributions 20 being oriented substantially perpendicular to the line segment that ends at the point being adjusted, and also being centered on line 21. The details of these adjustments may be substantially similar to the adjustment of point $C_1$, and thus are not described in detail herein in order to avoid needless repetition.

Although the adjustments of points $C_1$, $D_1$ and $E_1$ are presented sequentially in FIGS. 4a-c, adjustments of the individual points may be performed simultaneously, i.e., at the same time, via use of a Conjugate Gradient optimizer. If another optimizer is used, such as a Stochastic Gradient Descent optimizer, adjustments of the individual points may be performed sequentially or randomly. This flexibility in the order of adjustment may be due to the adjustment of each point being performed independently of the adjustment of any other point. That is, each point may be adjusted based upon the original positions of the other points as actually observed, rather than being based upon the adjusted positions of the other points. As specific examples, point $D_1$ may be adjusted in FIG. 4b based upon point $C_1$'s original, unadjusted position in FIG. 4a; and point $E_1$ may be adjusted in FIG. 4c based upon point $D_1$'s original, unadjusted position in FIGS. 4a and 4b. However, adjustment of each point based upon the original positions of the other points may occur within only one iteration of the optimization. Once all points are adjusted, the new, adjusted positions may be used as inputs for the next iteration.

As is the case with the two sets of observation points $A_1$-$G_1$ and $A_2$-$F_2$, one set may include a greater number of points, and consequently a greater number of line segments, than the other set. If the set being adjusted includes more points and line segments, then at least one line segment in the other set may necessarily serve as a corresponding line segment to more than one line segment in the first set. For example, the line segment joining points $B_2$ and $F_2$ may correspond to both the line segment joining points $E_1$ and $F_1$ and the line segment joining points $F_1$ and $G_1$. Similarly, if the set being adjusted includes fewer points and line segments, then at least one line segment in the other set may not serve as a corresponding line segment to any line segment in the first set.

In one embodiment, just as the first set of observation points is adjusted based upon the second set of observation points, the second set of observation points may also be adjusted based upon the first set of observation points. More particularly, the second set of observation points may be adjusted based upon the first set of points as the first set of points were observed before their adjustment.

Creating an exact probabilistic model of all potential environments may be infeasible and not even well defined. However, in most cases, making some assumptions is reasonable. For example, assuming the existence of smooth manifolds instead of randomly distributed surfaces may be a reasonable model.

In Equation (5) is defined a novel probabilistic model for the SLAM problem, and hereinabove are described the different components for this model. The problem is defined as finding the maximum a-posteriori solution (MAP) of Equation (5). Described hereinbelow is a practical implementation to calculate this solution.

Since maxima of Equation (5) are unaffected by monotone transformations, the negative logarithm of this expression may be turned into a sum and this expression may be optimized instead $$\hat{x}_{1:t}, \hat{m} = \underset{x_{1:t}, m}{\operatorname{argmin}} p(x_{1:t}, m | u_{1:t}, z_{1:t}) \quad (47)$$

$$= \underset{x_{1:t}, m}{\operatorname{argmin}} -\log \eta - \log p(x_0) - \log p(m) -$$

$$\sum_t \log p(x_t | x_{t-1}, u_t) -$$

$$\sum_t \sum_i \log p(z_t^i | x_t, m_i)$$

$$= \underset{x_{1:t}, m}{\operatorname{argmin}} E(x_{0:t}, m) \quad (48)$$

Finding the most probable solution reduces now to finding the global minimum of the function $E(x_{0:t}, m)$ which is a summation of log-likelihoods. The term $-\log \eta$ is a constant normalization factor and is not relevant for minimizing $E(x_{0:t}, m)$.

The algorithm of the present invention consists of three main parts: first the motion model and the observation model from Equations (7) and (27), respectively, are used to calculate an initial estimate for $x_{1:t}$ and $m_{1:t}$. Next, a preconditioning is applied to improve this estimate. Finally, a non-linear conjugate gradient variant is used to find the parameters which minimize $E(x_{0:t}, m)$. An outline of this algorithm is presented below as Algorithm 1.

---

Algorithm 1 Calculate $\hat{x}_{1:t}, \hat{m}$

1: for all constrols $u_t$ do
2:     $x_t \leftarrow$ motion_model ($u_t, x_{t-1}$)
3:     for all observations $z_t^i$ do
4:         $m_i \leftarrow$ observation_model ($x_t, z_t^i$)
5:     end for
6: end for
7: $x_{1:t}, m_{1:i} \leftarrow$ iterative_closest_point ($x_{1:t}, m_{1:i}$)
8: $y_0 = (x_{1:t}, m_{1:i})^T$
9: repeat
10:     create prior model $p(m)$
11:     find an $\alpha_i$ that minimizes $E(y_i + \alpha_i d_i)$
12:     update the state vector $y_{i+1} = y_i + \alpha_i d_i$
13:     calculate the new residual $r_{i+1} = -\nabla E(y_{i+1})$
14:     calculate $\beta_{i+1}^{FR} = (r_{i+1}^T r_{i+1})/(r_i^T r_i)$ (Fletcher-Reeves method)
15:     calculate the new search direction $d_{i+1} = r_{i+1} + \beta_{i+1} d_i$
16. until convergence

---

Regarding preconditioning, objective function $E(x_{0:t}, m)$ is unfortunately non-linear and thus finding the global minimum may be difficult. The approach of the present invention is to use a simple scan alignment algorithm prior to the optimization. In particular, the "iterative-closest-point" (ICP) algorithm is used to create an initial alignment and therefore a better staring point for the optimization. Experiments have shown that this starting point is usually sufficiently close to the global minimum of E that the optimization procedure described below converges into the correct solution.

Finding the most probable solution and therefore the most probable path and the most probable map is the task of finding the global minimum of the function $E(x_{1:t}, m)$. This minimization results in high dimensional, sparse optimization problem. The Nonlinear Conjugate Gradient Method (CG) of optimization may help to find a good solution. In the present invention, a Newton-Raphson line search and the Fletcher-Reeves formulation may be used to linearly combine the negative gradient of the function $E(x_{0:t}, m)$ with previous such gradients. In every iteration of CG, the prior model is rebuilt to ensure the best model is always used at each iteration. A more detailed outline is presented in Algorithm 1 above.

Figure 5:
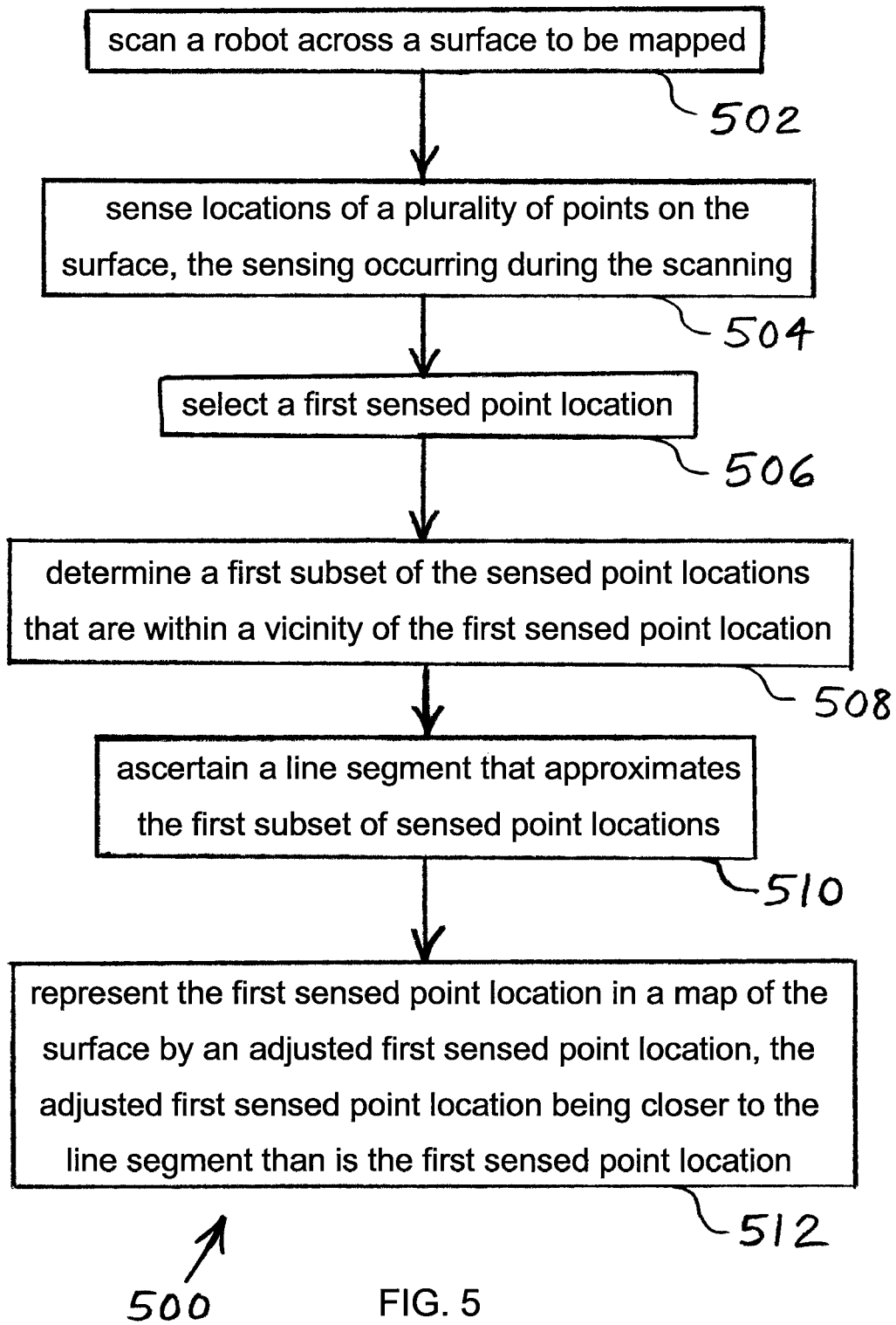
FIG. 5 is a flow chart of one embodiment of a mapping method of the present invention.

One embodiment of a robotic mapping method 500 of the present invention is illustrated in FIG. 5. In a first step 502, a robot is scanned across a surface to be mapped. For example, a robot may scan a surface while moving substantially parallel to the surface, while moving at an angle relative to the surface, or while moving in random directions.

In a second step 504, locations of a plurality of points on the surface are sensed, the sensing occurring during the scanning. For example, the robot may sense location points A-M in FIG. 2a while scanning.

In step 506, a first sensed point location is selected. For example, sensed point location F is selected in FIG. 2a. As other examples, locations G and H are selected in FIGS. 2b and 2c, respectively.

In a next step 508, a first subset of the sensed point locations that are within a vicinity of the first sensed point location are determined. For example, in FIG. 2a, sensed point locations C, D, E and G, H that are within a circle 12 having point location F at the center are determined. However, a vicinity is not restricted to an area of a certain size within the scope of the invention. For example, a vicinity of a first sensed point location may be defined as a certain number of other sensed point locations immediately preceding and/or following the first sensed point location.

Next, in step 510, a line segment that approximates the first subset of sensed point locations is ascertained. In the embodiment of FIG. 2*a*, line segment 14 is ascertained by the least squares method.

In a final step 512, the first sensed point location is represented in a map of the surface by an adjusted first sensed point location, the adjusted first sensed point location being closer to the line segment than is the first sensed point location. For example, sensed point location F may be represented in a surface map by an adjusted location that is closer to line segment 14 than is location F, and that is positioned approximately along arrow 15 in FIG. 2*a*.

Figure 6:
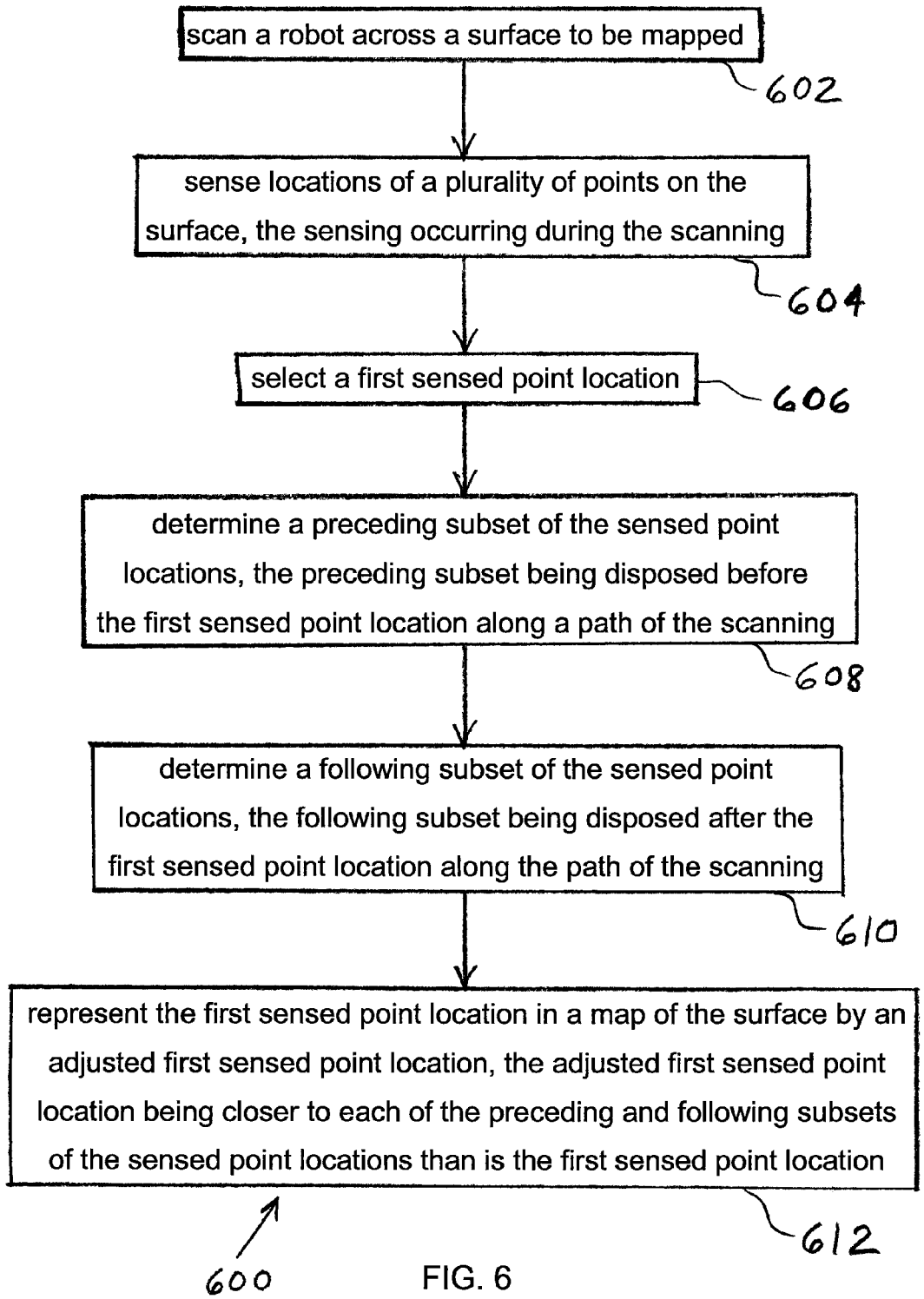
FIG. 6 is a flow chart of another embodiment of a mapping method of the present invention.

Another embodiment of a robotic mapping method 600 of the present invention is illustrated in FIG. 6. In a first step 602, a robot is scanned across a surface to be mapped. For example, a robot may scan a surface from the left-hand side to the right-hand side of FIG. 3*a*.

In a second step 604, locations of a plurality of points on the surface are sensed, the sensing occurring during the scanning. For example, the robot may sense location points AA-GG in FIG. 3*a* while scanning.

In step 606, a first sensed point location is selected. For example, sensed point location CC is selected in FIG. 3*a*. As other examples, locations DD and EE are selected in FIGS. 3*b* and 3*c*, respectively.

In a next step 608, a preceding subset of the sensed point locations is determined, the preceding subset being disposed before the first sensed point location along a path of the scanning. In the embodiment of FIG. 3*a*, for example, the preceding subset includes only a single sensed point location BB. Point location BB is disposed before point location CC along the left to right scanning path in FIG. 3*a*. However, it is possible within the scope of the invention for the preceding subset to include a plurality of sensed point locations, such as both BB and CC, for example.

Next, in step 610, a following subset of the sensed point locations is determined, the following subset being disposed after the first sensed point location along the path of the scanning. In the embodiment of FIG. 3*a*, for example, the following subset includes only a single sensed point location DD. Point location DD is disposed after point location CC along the left to right scanning path in FIG. 3*a*. However, it is possible within the scope of the invention for the following subset to include a plurality of sensed point locations, such as point locations DD, EE and FF, for example.

In a final step 612, the first sensed point location is represented in a map of the surface by an adjusted first sensed point location, the adjusted first sensed point location being closer to each of the preceding and following subsets of the sensed point locations than is the first sensed point location. For example, sensed point location CC may be represented in a surface map by an adjusted location that is closer to line segment 18 than is location CC, and that is positioned approximately along arrow 17 in FIG. 3*a*.

Figure 7:
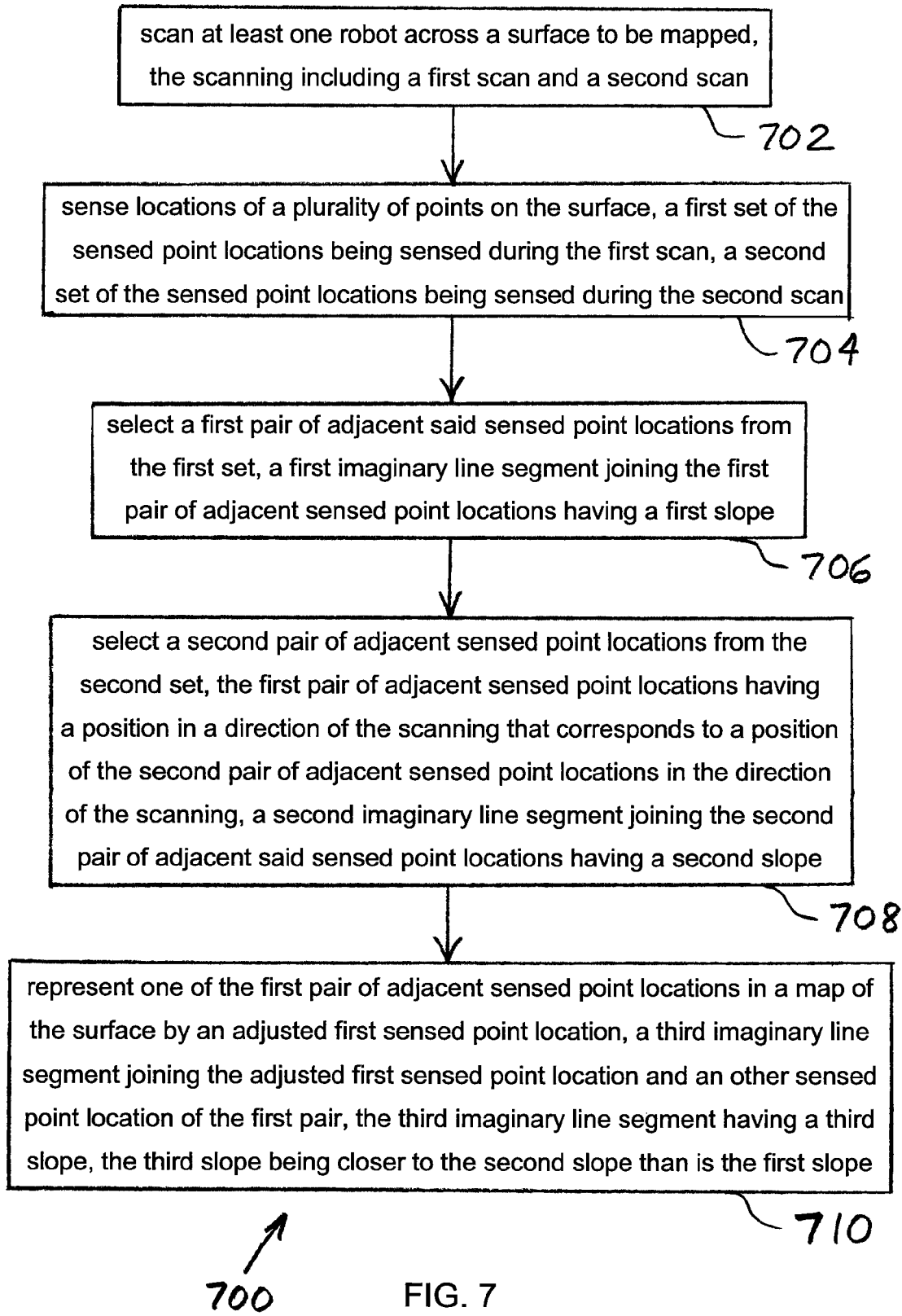
FIG. 7 is a flow chart of yet another embodiment of a mapping method of the present invention.

Another embodiment of a robotic mapping method 700 of the present invention is illustrated in FIG. 7. In a first step 702, at least one robot is scanned across a surface to be mapped, the scanning including a first scan and a second scan. For example, in the embodiment of FIG. 4*a*, at least one robot is scanned in a left to right direction across a surface to be mapped. The scanning includes a first scan and a second scan, and these scans may be performed by the same robot or by different robots.

In a second step 704, locations of a plurality of points on the surface are sensed, a first set of the sensed point locations being sensed during the first scan, a second set of the sensed point locations being sensed during the second scan. For example, in the embodiment of FIG. 4*a*, a first set of sensed point locations $A_1$-$G_1$ are sensed during a first scan, and a second set of sensed point locations $A_2$-$F_2$ are sensed during a second scan.

In step 706, a first pair of adjacent sensed point locations are selected from the first set, a first imaginary line segment joining the first pair of adjacent sensed point locations having a first slope. That is, adjacent sensed point locations $B_1$ and $C_1$ are selected from the first set. An imaginary line segment joining point locations $B_1$ and $C_1$ is shown in FIG. 4*a*, and this line segment appears to have a slope of approximately 0.5 in the viewpoint of FIG. 4*a*.

In a next step 708, a second pair of adjacent sensed point locations is selected from the second set, the first pair of adjacent sensed point locations having a position in a direction of the scanning that corresponds to a position of the second pair of adjacent sensed point locations in the direction of the scanning, a second imaginary line segment joining the second pair of adjacent sensed point locations having a second slope. For example, continuing with the example of FIG. 4*a*, a second pair of adjacent sensed point locations $B_2$ and $C_2$ are selected from the second set. The first pair of adjacent sensed point locations $B_1$ and $C_1$ have a position in a direction of the scanning (i.e., in the left to right direction) that corresponds to a position of the second pair of adjacent sensed point locations $B_2$ and $C_2$ in the direction of the scanning. That is, locations $B_1$ and $C_1$ may be approximately horizontally aligned with locations $B_2$ and $C_2$. Stated another way, locations $B_1$ and $C_1$ are relatively close to locations $B_2$ and $C_2$. A second imaginary line segment joins the second pair of adjacent sensed point locations $B_2$ and $C_2$, as shown in FIG. 4*a*. This line segment joining point locations $B_2$ and $C_2$ has a slope of approximately zero. That is, the line segment joining point locations $B_2$ and $C_2$ is approximately horizontal in the viewpoint of FIG. 4*a*.

In a final step 710, one of the first pair of adjacent sensed point locations is represented in a map of the surface by an adjusted first sensed point location, a third imaginary line segment joining the adjusted first sensed point location and an other sensed point location of the first pair, the third imaginary line segment having a third slope, the third slope being closer to the second slope than is the first slope. For example, in the embodiment of FIG. 4*a*, point location $C_1$ is represented in a map of the surface by an adjusted location that is closer to the line segment joining points $B_2$ and $C_2$ than is location $C_1$ and is positioned approximately along arrow 22 in FIG. 4*a*. A third imaginary line segment may join the adjusted first sensed point location and sensed point location $B_1$. This third imaginary line segment has a slope that is closer to the slope of the line segment joining points $B_2$ and $C_2$ than is the slope of the line segment joining points $B_1$ and $C_1$. This third imaginary line segment has a slope that is closer to the zero slope of the line segment joining points $B_2$ and $C_2$ (i.e., flatter) than is the slope of the line segment joining points $B_1$ and $C_1$.

The present invention has been described herein primarily in connection with mapping in planar environments with two-dimensional maps and poses to be estimated. However, it is to be understood that the present invention is equally applicable to two-dimensional maps and poses to be estimated.

While this invention has been described as having an exemplary design, the present invention may be further modified within the spirit and scope of this disclosure. This application is therefore intended to cover any variations, uses, or adaptations of the invention using its general principles.

What is claimed is:

1. A robotic mapping method, comprising:
scanning a robot across a surface to be mapped;
sensing locations of a plurality of points on the surface, the sensing occurring during the scanning;
selecting a first said sensed point location;
determining a first subset of the sensed point locations that are within a vicinity of the first sensed point location;
ascertaining a line segment that approximates the first subset of sensed point locations; and
representing the first sensed point location in a map of the surface by an adjusted first sensed point location, the adjusted first sensed point location being closer to the line segment than is the first sensed point location.

2. The method of claim 1 wherein the point locations are sensed in a plurality of scans.

3. The method of claim 1 wherein the selecting, determining, ascertaining and representing steps are repeated for each of the sensed point locations other than the first sensed point location.

4. The method of claim 1 wherein the vicinity of the first sensed point location comprises a circular area having the first sensed point location at a center of the circular area.

5. The method of claim 1 comprising the further step of calculating a probabilistic distribution associated with the adjusted first sensed point location, the probabilistic distribution having a peak value at the line segment and having values decreasing in directions substantially perpendicular to the line segment, the representing step being dependent upon the probabilistic distribution.

6. The method of claim 5 wherein the probabilistic distribution comprises a sub-quadratic normal distribution.

7. The method of claim 6 wherein the sensed point locations are substantially co-planar.

8. A robotic mapping method, comprising:
using a robot to sense locations of a plurality of points on a surface to be mapped; and
representing a first said sensed point location in a map of the surface by an adjusted first sensed point location, the adjusted first sensed point location being dependent upon at least a second sensed point location and a third said sensed point location.

9. The method of claim 8 wherein the robot senses the locations in a plurality of scans of the robot across the surface, at least one of the second and third sensed point locations being sensed in a different scan of the robot than is the first sensed point location.

10. The method of claim 8 comprising the further step of calculating a probabilistic distribution associated with the adjusted first sensed point location, the probabilistic distribution being dependent upon the second and third sensed point locations, the representing step being dependent upon the probabilistic distribution.

11. The method of claim 8 wherein the adjusted first sensed point location is dependent upon a slope of a first imaginary line segment joining the second sensed point location and the third said sensed point location.

12. The method of claim 11 wherein the adjusted first sensed point location is dependent upon a slope of a second imaginary line segment joining the first sensed point location and a fourth sensed point location, the fourth sensed point location being sensed in a same scan of the robot as is the first sensed point location.

13. A robotic mapping method, comprising:
scanning at least one robot across a surface to be mapped, the scanning including a first scan and a second scan;
sensing locations of a plurality of points on the surface, a first set of the sensed point locations being sensed during the first scan, a second set of the sensed point locations being sensed during the second scan;
selecting a first pair of said sensed point locations from the first set, a first imaginary line segment joining the first pair of said sensed point locations having a first slope;
selecting a second pair of said sensed point locations from the second set, the first pair of sensed point locations having a position in a direction of the scanning that substantially corresponds to a position of the second pair of sensed point locations in the direction of the scanning, a second imaginary line segment joining the second pair of said sensed point locations having a second slope; and
representing one of the first pair of sensed point locations in a map of the surface by an adjusted first sensed point location, a third imaginary line segment joining the adjusted first sensed point location and an other sensed point location of the first pair, the third imaginary line segment having a third slope, the third slope being closer to the second slope than is the first slope.

14. The method of claim 13 wherein the one of the first pair of sensed point locations that is adjusted follows the other sensed point location of the first pair along the direction of the scanning.

15. The method of claim 13 wherein the selecting and representing steps are repeated for each of the sensed point locations in the first set.

16. The method of claim 13 comprising the further step of calculating a probabilistic distribution associated with the adjusted first sensed point location, the probabilistic distribution having a peak value disposed at a location where the third slope is approximately equal to the second slope, the distribution having values decreasing in all directions away from the peak value, the representing step being dependent upon the probabilistic distribution.

17. The method of claim 16 wherein the probabilistic distribution comprises a quadratic normal distribution.

18. The method of claim 13 wherein the sensed point locations in the first set and the second set are substantially co-planar.

19. The method of claim 13 wherein the selected first pair of said sensed point location are adjacent to each other.

20. The method of claim 19 wherein the selected second pair of said sensed point location are adjacent to each other.

* * * * *